Figure 1:
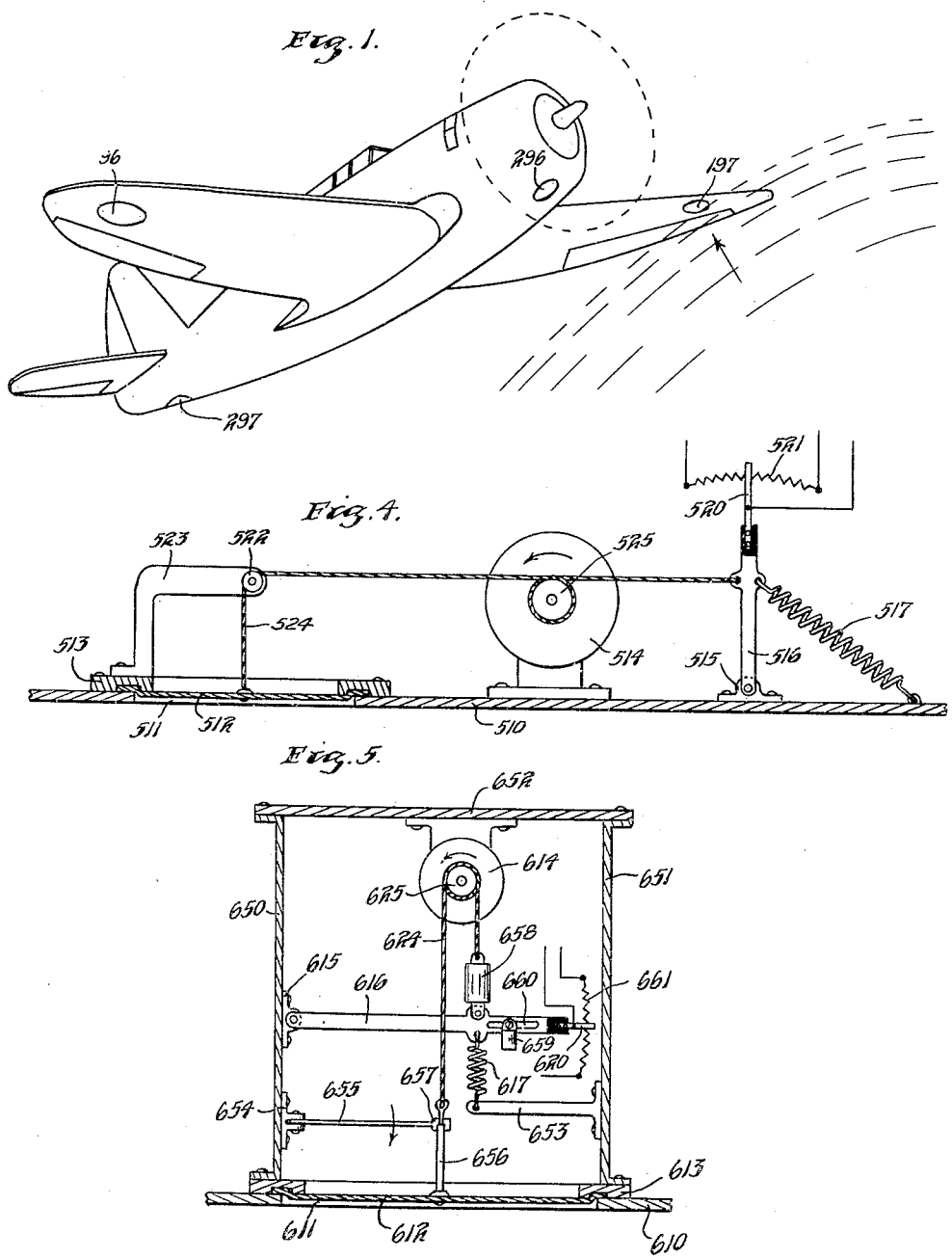

Feb. 21, 1950        G. L. BORELL        2,498,064

STABILIZING APPARATUS FOR AIRCRAFT

Filed Feb. 28, 1944        3 Sheets-Sheet 1

Inventor
GEORGE L. BORELL

By

George H. Fisher
Attorney

Inventor
GEORGE L. BORELL
BY George H. Fisher
Attorney

Feb. 21, 1950 — G. L. BORELL — 2,498,064
STABILIZING APPARATUS FOR AIRCRAFT
Filed Feb. 28, 1944 — 3 Sheets-Sheet 3
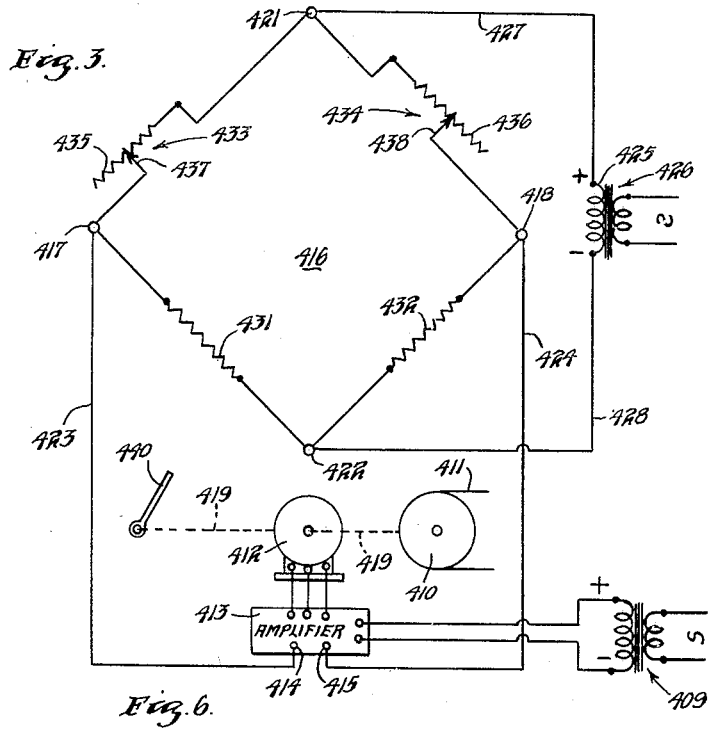
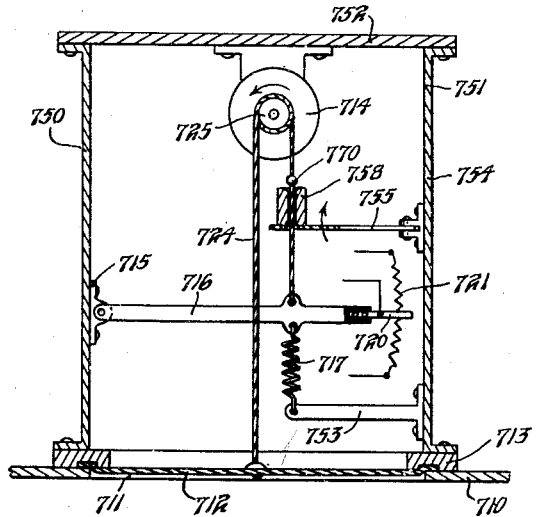
Inventor
GEORGE L. BORELL
By George H. Fisher
Attorney Patented Feb. 21, 1950

2,498,064

UNITED STATES PATENT OFFICE 2,498,064

STABILIZING APPARATUS FOR AIRCRAFT

George L. Borell, Minneapolis, Minn., assignor to Minneapolis-Honeywell Regulator Company, Minneapolis, Minn., a corporation of Delaware Application February 28, 1944, Serial No. 524,179

18 Claims. (Cl. 244—77)

The present invention relates to the field of aeronautics, and more particularly to means for stabilizing the attitude of an aircraft which is flying through an atmosphere subject to high pressure waves, such as that in an area where anti-aircraft projectiles are exploding, or to sudden and marked changes in barometric pressure or variations in air density as found in ordinary bumpy air.

An object of the present invention is to provide an improved flight control system for aircraft, of the type shown and described in the copending application of Willis H. Gille, Serial No. 447,989, filed June 22, 1942.

It is another object of my invention to provide, in a manually controlled aircraft, means independent of the manual control for stabilizing the craft about the pitch and roll axes.

It is a further object of my invention to provide means for stabilizing and aircraft, about the pitch and roll axes, which is effectively responsive to very brief changes in the pressure differential between two pressure responsive members spaced about each of the axes.

A still further object of my invention is to provide such a stabilizer including means for modifying the effect of the pressure-differential responsive means by a further component responsive to vertical acceleration.

Yet another object of my invention is to provide means for prolonging the effect of a substantially instantaneous mechanical response through a period having measurable duration.

Figure 2:
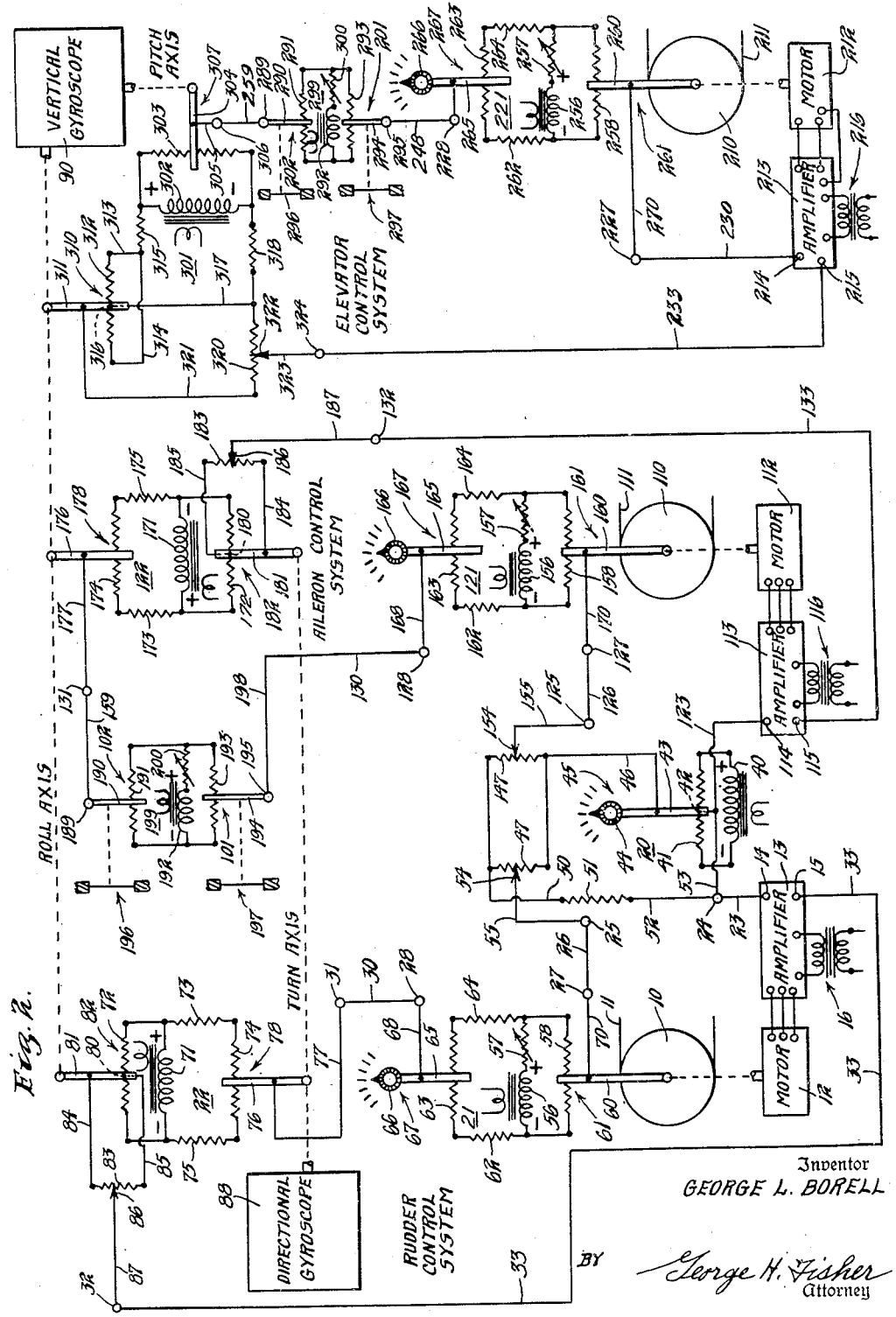

Various other objects, advantages, and features of novelty which characterize my invention are pointed out with particularity in the claims annexed to and forming a part of this application. However, for a better understanding of the invention, its advantages, and objects attained with its use, reference should be had to the subjoined drawings, which form a further part of this specification, together with the accompanying descriptive matter, in which I have illustrated and described certain preferred embodiments of the invention. In the drawing:

Figure 1 is a view of an aircraft in flight, showing locations for my pressure responsive members, Figure 2 is an electrical wiring diagram of an automatic flight control system for an aircraft, embodying my invention, and including, somewhat diagrammatically, certain mechanical features of my invention.

Figure 3 is an electrical wiring diagram of a stabilizing system for the roll axis of an otherwise manually controlled aircraft, embodying my invention, and including, somewhat diagrammatically, certain mechanical features of my invention, Figure 4 is a fragmentary view showing, somewhat diagrammatically, a pressure responsive variable resistance with damping action which is comprised in my invention, Figure 5 is a view similar to Figure 4, but showing means for modifying the response of the variable resistor by factors due to the vertical acceleration of the assembly, and Figure 6 is a view similar to Figure 5, but showing a refinement of the device in which the inertia of the acceleration responsive member has a minimum effect on the sensitivity of the pressure responsive apparatus.

It is known that the lifting force on a wing is supplied by the atmosphere through which the wing is moving, partly by an upward pushing component on the lower surface of the wing, and partly by an upward pulling component on the upper surface of the wing. Each of these components varies with the density of the air and the speed of the wing with respect thereto.

The speed of the wing, in flight, is under the control of the aviator. The density of the air depends on a number of factors of which altitude and temperature are ordinarily the only significant ones. In a nonhomogeneous atmosphere the density is continually varying from point to point, especially along the boundary between air masses of widely different characteristics. Even in the absence of vertical air currents, a craft flying directly across such a boundary evinces a sudden and noticeable change in lift. If the craft happens to be flying along the boundary, one wing receives greater lift than the other, and the craft rolls.

A third factor of air density is of significance to military aircraft. The explosion of an anti-aircraft shell sets up a train of pressure waves in the air, which radiate outwardly from the center of the explosion at the speed of sound, decreasing in magnitude as they do so. This train of pressure waves is in addition to the actual change in density of the atmosphere in the immediate vicinity of the explosion due to the release of considerable quantities of gas at high temperature. Of the pressure waves, the first is of comparatively larger significance, and comprises what might be called a stratum of air of greater than normal density followed by a stratum of air of less than normal density.

The movement of the wing through the air translates all changes in atmospheric density into changes in pressure upon the wing surfaces. Lift of the craft is brought about by positive pressure upon the lower surface and negative pressure upon the upper surface of the wings, stabilizers and so forth, and pressure differential between the two wings for example, brings about a change in the attitude of the craft which must be cancelled by proper actuation of the control surfaces.

Referring now to Figure 1, it will be seen that I have disclosed an aircraft in flight, and a pressure wave approaching it from below and from the pilot's left. Under these conditions, it will be seen that there is a momentary excessive pressure on the under side of the left wing of the craft as compared with the normal aerodynamic pressure on the under side of the right wing of the craft. This unbalance in pressure, although temporary, may nevertheless be of sufficient magnitude to cause a change in attitude of the craft which must be overcome by the pilot if the plane is manually controlled, or by the flight control system if the plane is automatically controlled. The unbalanced pressure in any case induces strain in the framework of the craft because, due to its inertia, it cannot respond to changes of such rapidity.

It will be understood that in certain cases the wave and craft are so moving that at the next instant the excessive pressure is upon the under side of the right wing rather than upon the under side of the left wing, in which case an automatic reversal of the plane's conditions just described is accomplished. However, there are other occasions when, due to the relative location of the craft with respect to the center of the pressure wave, and to the relative velocities of the craft and of the pressure wave, the change in pressure underneath the right wing may not totally balance the change in pressure underneath the left wing. This situation can also arise when a craft is flying along the boundary between areas of higher and lower atmospheric density, as often occurs in flights through bumpy air.

I have shown in Figure 1 that the aircraft is provided with a pair of pressure responsive members 196 and 197 equally spaced about the roll axis of the craft, and a second pair of pressure responsive members 296 and 297 spaced about the pitch axis of the craft. The construction of these members, and their function with relation to the control of the craft, are given below. However, it must now be understood that the effect of each of these pressure responsive members is to cause a contact arm to move across a resistance winding, from a zero position, a distance proportional to the change in pressure upon the responsive member from that at a predetermined standard, and that two such devices are required in order that the pressure differential between them may be used as the condition to which the stabilizer is responsive, to avoid compensating the device for change of pressure on the pressure responsive member due only to change in altitude, for example.

Referring now to Figure 2, there is shown a rudder control system including a pulley 10 over which passes a cable 11 which may be attached to the rudder (not shown). The pulley 10 is driven by a motor 12. The supply of electrical energy to motor 12 is controlled by an amplifier 13 having a pair of input terminals 14 and 15. Electrical energy is supplied to the amplifier 13 from a transformer 16.

Electrical signal potentials are impressed on amplifier input terminals 14 and 15 by means of a series circuit including a manual control network 20, an adjustment network 21, and a condition responsive control network 22. This series circuit may be traced from amplifier input terminal 14 through a conductor 23, a first terminal 24 of manual control network 20, network 20, a second terminal 25 of network 20, a conductor 26, a first terminal 27 of adjustment network 21, network 21, a second terminal 28 of network 21, a conductor 30, a first terminal 31 of condition responsive network 22, network 22, a second terminal 32 of network 22, and a conductor 33 to amplifier input terminal 15.

The manual control network 20 is of the type described and claimed in the co-pending joint application of Robert J. Kutzler and Theodore J. Wilson, Serial No. 469,626, filed December 21, 1942. The manual control network 20 is supplied with electrical energy from a transformer having a secondary winding 40. A resistance winding 41 having a center tap 42 is connected across the terminals of winding 40. A contactor 43 is slidable along the winding 41 for manipulation by a knob 44. The knob 44, contactor 43, and winding 41 together comprise a control point adjuster 45. Contactor 43 is connected in a loop circuit which may be traced through a conductor 46, a pair of resistance windings 47 and 147 connected in parallel, a conductor 50, a fixed resistor 51, a conductor 52, terminal 24 of network 20 and a conductor 53 to the center tap 42 on winding 41. It may therefore be seen that in the network 20, the difference in potential between contactor 43 and center tap 42 is impressed on the loop circuit just traced, and that the phase of this potential difference reverses when contactor 43 moves along winding 41 from one side of tap 42 to the other.

A contactor 54 is associated with winding 47 and is connected through a conductor 55 to terminal 25 of network 20. It will therefore be seen that a variable portion of the potential difference between contactor 43 and tap 42, depending in magnitude upon the position of conductor 54 on winding 47, appears between the network terminals 24 and 25 and is thereby impressed on the series circuit connected between the amplifier input terminals 14 and 15.

The adjustment network 21 includes a transformer having a secondary winding 56, and a variable resistor 57, connected in series with the secondary winding. A resistance winding 58 is connected across the terminals of that series circuit. A contactor 60 is fixed on the shaft of pulley 10 and cooperates with winding 58 to form a follow-up potentiometer 61.

Connected in parallel with resistance winding 58 is another branch circuit which includes a fixed resistor 62, a resistance winding 63, and a fixed resistor 64, all connected in series. A contactor 65 cooperates with winding 63 and is movable therealong by means of a knob 66. The knob 66, contactor 65, and winding 63 together form a centering adjuster 67. Contactor 65 is connected through a conductor 68 to output terminal 28 of network 21. Contactor 60 is connected through a conductor 70 to output terminal 27 of network 21. It will therefore be seen that the adjustment network 21 introduces into the series circuit connecting amplifier input terminals 14 and 15 a signal potential whose magnitude and phase depend upon the relative positions of contactors 65 and 60 along their respective resistance windings.

The condition responsive network 22 includes a transformer having a secondary winding 71 across the terminals of which is connected a resistance winding 72. Connected in parallel with winding 72 is another branch circuit including a fixed resistor 73, a resistance winding 74, and a fixed resistor 75. A contactor 76 cooperates with winding 74 and is connected through a conductor 77 to terminal 31 of network 22. Winding 74 and contactor 76 together form a rudder control potentiometer 78.

Resistance winding 72 is provided with a center tap 80. A contactor 81 cooperates with winding 72 to form a rudder compensating potentiometer 82. A resistance winding 83 is connected to contactor 81 and to tap 80 on winding 72 by means of conductors 84 and 85, respectively. A contactor 86 is adjustable along winding 83 and is connected through a conductor 87 to output terminal 32 of network 22.

Contactor 76 of control potentiometer 78 is moved along its associated winding 74 by a directional gyroscope 88. As long as the aircraft maintains a predetermined course, the gyroscope 88 holds contactor 76 at the center of its associated winding. Upon deviation of the aircraft from that course, the gyroscope 88 moves the contactor 76 to the left or right, depending upon the direction and magnitude of the deviation.

Contactor 81 of the rudder compensating potentiometer 82 is operated by a vertical gyroscope 90 in accordance with the tilting of an aircraft about an axis passing through it longitudinally from nose to tail.

Since the primary function of the rudder is to turn the aircraft, the directional gyroscope 88 is used to operate the main potentiometer 78 of the rudder control system. Since the rudder also functions to a limited extent to control the banking of the aircraft, the vertical gyroscope 90 controls the compensating potentiometer 82. It will therefore be seen that the condition responsive control network 22 introduces into the series circuit connecting amplifier input terminals 14 and 15 a signal potential whose magnitude and phase depend on the relative positions of contactors 76 and 81 along windings 74 and 72 as influenced by gyros 88 and 90.

The details of the aileron control system shown in the drawing are, except for certain features specifically mentioned hereinafter, the same as the corresponding details of the rudder control system. Therefore, each element of the aileron control system has been given a reference numeral, in the series between 100 and 199 which corresponds to the reference numeral in the series between 1 and 99 of its equivalent element in the rudder control system. Only a brief additional description of the elements in the aileron control system will be given.

Electrical signal potentials are impressed on the amplifier input terminals 114 and 115 by means of a series circuit including manual control network 20, an adjustment network 121, a condition responsive network 122, and a stabilizing circuit 199. It will be seen that this series network is similar to that in the rudder control system, with the exception that an additional stabilizing network 199 having terminals 189 and 195 has been introduced into the series circuit.

The circuit may be traced from amplifier input terminal 114 through a conductor 123, the first terminal 24 of manual control network 20, network 20, a third terminal 125 of network 20, conductor 126, a first terminal 127 of adjustment network 121, network 121, a second terminal 128 of adjustment network 121, a conductor 198, a first terminal 195 of stabilizing network 199, network 199, a second terminal 189 of stabilizing network 199, a conductor 159, a first terminal 131 of condition responsive network 122, network 122, a second terminal 132 of network 122, and a conductor 133 to amplifier input terminal 115.

Stabilizing network 199 includes a transformer having a secondary winding 192, and a variable resistor 200 connected in series with the secondary winding. A resistance winding 193 is connected across the terminals of that series circuit and a contactor 194 cooperates with winding 193 to form a first pressure responsive potentiometer 101. Connected in parallel with winding 193 is another resistance winding 191, and a contactor 190 cooperates with winding 191 to comprise a second pressure responsive potentiometer 102.

Contactor 190 is moved across winding 191 in response to movement of the pressure responsive member 196, and contactor 194 is moved across winding 193 in response to the movement of the second pressure responsive member 197. The location of pressure responsive members 196 and 197 with respect to the plane is shown in Figure 1, and the construction of these members is more fully set forth below.

As long as the pressures upon responsive members 196 and 197 are the same, contactors 190 and 194 are in electrically identical positions with respect to windings 191 and 193, and no resulting potential difference is inserted into the series circuit including networks 20, 121, 122, and 199. However, if a difference exists between the pressure on member 196 and the pressure on member 197, contactors 190 and 194 are no longer on electrically identical portions of their respective windings, and a signal potential is fed into the series circuit depending in phase and magnitude on the direction and magnitude of the displacement of sliders 190 and 194 from their central positions.

It should be noted that the manual control network 20 is common to both the rudder control system and the aileron control system. The primary function of the aileron is to control the tilting of the aircraft about its longitudinal axis and therefore the main potentiometer 178 is operated by the vertical gyroscope 90 in accordance with the tilting of the aircraft about that axis. Since the ailerons also operate to cause a turning of the aircraft, the compensating potentiometer 182 is operated by the directional gyroscope 88 in accordance with the deviation of the aircraft from its course.

In the elevator control system, those elements which correspond to equivalent elements in the rudder and aileron control systems have been given reference numerals in the series between 200 and 299, which correspond to the reference characters of their equivalent elements in the rudder and aileron control systems. Elements of the elevator control systems which have no counterpart in the rudder and aileron control systems, have been given reference characters in the 300 to 399 series.

Electrical signal potentials are impressed on the amplifier input terminals 214 and 215 by means of a series circuit including an adjustment network 221, a stabilizing network 299, and a condition responsive network 301. It will be seen that there is no manual control network, and that output terminal 227 of adjustment network 221 is directly connected to input terminal 214 of amplifier 213 by means of a conductor 230.

The series circuit may be traced from amplifier input terminal 214 through conductor 230, a first terminal 227 of adjustment network 221, network 221, a second terminal 228 of network 221, a conductor 248, a first terminal 295 of stabilizing network 299, network 299, a second terminal 289 of network 299, a conductor 259, a first terminal 306 of condition responsive network 301, network 301, a second terminal 324 of network 301, and a conductor 233 to amplifier input terminal 215.

The condition responsive control network 301 used in the elevator control system is somewhat different from the corresponding networks of the rudder and aileron control systems. Network 301 includes a transformer having a secondary winding 302 across whose terminals is connected a resistance winding 303. A contactor 304 cooperates with resistance winding 303 and is moved along the winding by the vertical gyroscope 90 in accordance with the tilting of the aircraft about an axis passing laterally therethrough from side to side. Contactor 304 is connected through a conductor 305 to terminal 306 of network 301. Winding 303 and slider 304 together form an elevator control potentiometer 307.

There is also included in the network 301 a resistance winding 312, with which a contactor 311 cooperates to form an elevator compensating potentiometer. The terminals of resistance winding 312 are connected through conductors 313 and 314, respectively, to a fixed resistor 315, whose other end is connected to one terminal of secondary winding 302. Winding 312 is provided with a center tap 316 which is connected through a conductor 317 and a fixed resistor 318 to the other terminal of winding 302. Another resistance winding 320 is connected between contactor 311 and center tap 316 by means of conductors 321 and 317. A contactor 322 cooperates with winding 320, and is connected through a conductor 323 to output terminal 324 of network 301.

The various transformer windings must be energized from the same source of alternating electrical energy, in order that the phase relationship of the various voltages supplied by these transformers may be properly maintained.

Each of the amplifiers operates in response to the phase of the electrical signal potential applied to its input terminal to cause operation of the motor controlled by the amplifier in one direction or the other. Any suitable amplifier having this characteristic may be used, but I prefer to use either one of the type disclosed in the co-pending Gille application, previously referred to, or the improved type shown in Patent No. 2,425,734 of Willis H. Gille, William J. Field, and Theodore J. Wilson.

Operation

When the parts are in the position shown in the drawing, no signal is introduced into the input circuit of any of the amplifiers. Referring to the rudder control system, it will be seen that in the manual control network 20 no potential is impressed across windings 47 and 51, and hence terminals 24 and 25 of network 20 are at the same potential. In the adjustment network 21, contactors 65 and 60 are at the centers of their respective windings, and hence are at the same potential. Therefore, no signal potential is produced between terminals 27 and 28 of network 21. Likewise, in the control network 22, contactors 76 and 81 are at the centers of their respective windings and hence no signal potential is produced between terminals 31 and 32 of network 22. Similar conditions exist in the aileron control system, with the further condition that in stabilizing network 199 contactors 190 and 194 are equally displaced from the left ends of their respective windings, and hence no signal potential is produced between the terminals 189 and 195 of the network. The same conditions prevail in the elevator control system, and hence motors 12, 112, and 212 are all stationary.

For the sake of convenience in describing the operation of this system, it is described as though the operation takes place during a half cycle of the alternating current supply when the polarities of the terminal potentials of the various transformer secondary windings are those indicated by the respective legends on the drawing. It will be realized that in the next half cycle all the voltages reverse in phase and therefore remain in the same phase relation with respect to one another.

Starting with the condition illustrated in the drawing, let it be assumed that the direction of flight of the aircraft changes due to some external condition and that in response to this change in course the directional gyroscope moves contactor 76 to the right along winding 74. As a result of this movement, terminal 31 of network 22 is made positive with respect to terminal 32 and this potential difference is transmitted through networks 21 and 20 to terminal 14 of amplifier 13, thereby making terminal 14 positive with respect to input terminal 15.

Motor 12 and amplifier 13 may be so arranged that when a potential of this phase is impressed on input terminals 14 and 15, the amplifier responds to cause operation of the motor in a direction to move contactor 60 to the left along winding 58. Contactor 60 is thereby made more negative than contactor 65, and hence output terminal 27 of network 21 is more negative than output terminal 28. The output terminals of networks 21 and 22 are now connected in series and are opposite in polarity. When these two opposing potentials become equal in magnitude, the potential impressed on input terminals 14 and 15 of the amplifier becomes zero, and the motor is stopped.

The turning of the rudder by the operation of motor 12 causes the aircraft to turn in a direction to resume its previous course. As it approaches its previous course, contactor 76 is moved back towards its normal position by the directional gyroscope, and the amplifier responds to the change in potential impressed on its input terminals by causing a following movement of the slider 60 back towards its normal position.

In the foregoing description of the operation of the rudder, the effect of the aileron control system has been omitted for the sake of simplicity. It should be noted, however, that when contactor 76 is moved to the right along winding 74, slider 181 is likewise moved to the right along winding 172. This movement of contactor 181 makes output terminal 132 of network 122 negative with respect to output terminal 131. Terminal 114 of amplifier 113 is thereby made positive with respect to terminal 115. The amplifier causes a response in motor 112, to actuate the ailerons away from their normal or streamlined position, and at the same time to drive contactor 160 to the left along winding 168, thereby producing at the output terminals of adjustment network 121 a potential opposite in polarity to the control potential existing at the terminals of control network 122. When these two opposing potentials become equal, the motor 112 stops.

Operation of the ailerons as the slider 160 is moved to the right causes the aircraft to bank or tilt about its longitudinal axis. The craft continues to roll in the same direction as long as the ailerons are displaced from their streamlined position, and means must accordingly be provided to streamline the ailerons when the desired angle of bank is attained. This function is accomplished by the vertical gyroscope which, under the conditions outlined above, moves contactor 176 to the right along winding 174. This motion of the contactors tends to reduce the potential between the output terminals of control network 122 and thereby to introduce into the input terminals of amplifier 113 a potential which tends to energize motor 112 to streamline the ailerons. As a matter of fact, the potential due to movement of contactor 176 appears almost as soon as that due to movement of contactor 181, so that in practice the position taken by the ailerons and by contactor 160 under the control of motor 112, at any instant during the maneuver, is determined jointly by the positions of contactors 176 and 181. The relative effect of equal movements of these two contactors is regulated by adjustment of slider 186 with respect to resistance winding 183, which varies the magnitude of the available portion of the total voltage due to displacement of contactor 181 from center tap 180.

In installing this system the directional gyroscope is maintained displaced by a given amount, and the craft is allowed to come to an equilibrium as regards bank, meanwhile flying in a circle. This equilibrium is necessarily reached, since contactor 176 is operated by the vertical gyroscope as long as any change in bank takes place, while the position of contactor 181 is fixed by fixing the displacement of the directional gyroscope. The optimum angle of bank of the craft for a given displacement of the directional gyroscope has been experimentally determined, and after equilibrium has been reached the setting of slider 186 is adjusted until the desired angle of bank is maintained.

The vertical gyroscope is also effective, when the craft banks under the conditions previously outlined, to move contactor 81 to the right along winding 82, deriving from the displacement of contactor 81 from center tap 80, and introducing into the input terminals of amplifier 13, a potential which tends to energize motor 12 to return the rudder to its streamlined position. The actual potential effective upon amplifier 13 is accordingly the difference between that due to displacement of contactor 76 and that due to displacement of contactor 81. When the rate of turn of the craft becomes constant (that is, when the potential due to the two displacements just recited is balanced by displacement of slider 60), the relative effectiveness of the two displacements on the circuit is determined by the setting of slider 86 along winding 83.

The installation of the system previously described is continued by adjusting contactor 86 until, for the particular displacement of the directional gyroscope and the corresponding adjusted bank of the craft, the turn executed by the craft is properly coordinated as indicated by the ball bank indicator.

From a study of Figure 2 it will now be apparent that on departure of the craft from its proper course the rudder and ailerons are given an initial large deflection to start the aircraft banking and turning, but after the banked turn has started the deflections of the rudder and ailerons from their normal position are reduced, the latter practically to zero. The reason for restoring the ailerons to streamlined position has already been set forth. The rudder displacement is reduced because it has been found that a smaller deflection of the rudder is sufficient to maintain the aircraft in a properly banked turn after it has once been placed in that position by a larger deflection. If the larger deflection is maintained after the aircraft enters the banked turn, a side slip results.

The cooperation of the rudder and ailerons during a turn in a system of this type is more completely described in the co-pending Gille application, previously referred to, and it is believed that the foregoing description will be sufficient for the purpose of the present application.

Referring to the adjustment network 21, it may be seen that upon an operation of the controller 67, amplifier 13 is energized to cause a following movement of contactor 60. The controller 67 may therefore be utilized to set the position of contactor 60 which the system will maintain for a given position of contactor 76. It is termed a centering adjustment, since its primary purpose is to enable the pilot or other operator of the system to insure that the rubber is maintained in a central position when the controllers 78 and 82 are in their respective central positions.

The variable resistor 57 determines the voltage applied to the terminals of windings 58 and 63. It therefore determines the potential drop per unit length along winding 58 and hence establishes the distance through which contactor 60 must move along winding 58 to produce between output terminals 27 and 28 a given value of potential. It is termed a ratio adjustment, since it establishes the ratio between a given movement of either of the contactors 76 and 81 and the following movement obtained from the rebalancing contactor 60. Since variation of resistance of resistor 57 simultaneously changes the potential drops, per unit length, along resistances 58 and 63, and changes them in the same proportions, it may be seen that adjustment of resistor 57 does not affect the centering adjustment produced by operation of controller 67.

Now starting again with the conditions illustrated in the drawing, and considering the aileron control system, let it be assumed that the attitude of the aircraft changes due to some external condition and that in response to this change in attitude the vertical gyroscope 90 moves contactor 176 to the left along winding 174. As a result of this movement, terminal 131 of network 122 is made positive with respect to terminal 132 and this potential difference is transmitted through networks 199, 121, and 20, to amplifier 113, thereby making terminal 114 positive with respect to terminal 115.

Motor 112 and amplifier 113 are so arranged that when a potential of this polarity is impressed on input terminals 114 and 115 the amplifier responds to cause operation of the motor in a direction to move contactor 160 to the left along winding 158. Contactor 160 is thereby made more negative than contactor 165, and hence output terminal 127 of network 121 is more negative than output terminal 128. The output terminals of networks 121 and 122 are now connected in series and are opposite in polarity. When these two opposing potentials become equal in magnitude, the potential impressed on input terminals 114 and 115 of the amplifier becomes zero, and the motor is stopped.

The movement of the ailerons by the operation of motor 112 causes the aircraft to roll in a direction to resume its previous level condition. As it resumes this condition, slider 176 is moved back towards its normal position by the vertical gyroscope, and the amplifier responds to the change in potential impressed on its input terminals by causing a following movement of contactor 160 back to its normal position.

In the foregoing description of the operation of the aileron control system, the effect of the rudder control system has been omitted for the sake of simplicity. It has been found that when a craft is banked rather than in level flight it tends to fall away from its proper course in the direction of the lower wing, and that, to maintain a proper course, the rudder must be displaced in the opposite direction. This is accomplished in the present system by a link between the vertical gyroscope and the rudder control system. When contactor 176 is moved to the left along winding 174, contactor 81 is likewise moved to the left along winding 72. This movement of contactor 81 makes output terminal 32 of network 22 negative with respect to output terminal 31. Input terminal 14 is therefore made positive with respect to input terminal 15 of amplifier 13. Amplifier 13 causes a response of motor 12 to move slider 60 to the left along resistance 58 thereby producing at the output terminals of adjustment network 21 a potential opposite in polarity to the control potential existing at the terminals of control network 22. When these two opposing potentials become equal, the motor 12 stops.

However, the operation of the motor causing slider 60 to move to the left causes the rudder to deviate from its normal position in straight flight, and the aircraft turns from its course. Because of this departure from the course, the directional gyroscope 88 operates slider 76 and 181 to the right along their respective slidewires to place the craft in a properly banked turn to replace it in the proper course, as was described above. At the same time, the movement of the ailerons caused by energization of motor 113 causes the aircraft to return to the proper attitude, and the rudder and aileron control motors follow the signals of the vertical and directional gyroscopes as straight level flight is again attained.

Referring now to the control network 301 in the elevator control system, it may be seen that this network produces at its terminals 306 and 324 a potential which varies both in polarity and magnitude in accordance with the tilting of the aircraft about its lateral axis, as determined by the vertical gyroscope 90 operating the slider 304. In addition, the potential between the output terminals 306 and 324 varies in accordance with the magnitude of the displacement of the aircraft from the normal position with respect to its longitudinal axis but is not oppositely affected by displacements about its longitudinal axis in opposite directions. This latter effect is obtained because both terminals of the slidewire resistance 312 are connected to one end of the secondary winding 302 and its center tap 316 is connected to the other end. Hence, movement of slider 311 in either direction from its central position causes terminal 324 to become positive with respect to terminal 306. The resistances 315 and 318 are provided in order that the potential of output terminal 324 may be substantially the same as that of output terminal 306 when the sliders 304 and 311 are both in the center of their respective slidewires. The values of resistances 315 and 318 are so selected with reference to the value of resistance 312 that the total resistance value of resistance 315 and the two parallel connected halves of resistance 312 is equal to the resistance value of resistance 318. Thus, the potential at the center tap 316 will be the same as the potential at the center of potentiometer 307. The slider 322 serves to adjust the proportion of the output potential of network 301 produced by controller 310 with respect to the proportion produced by the controller 307.

The elevator control system tends to maintain the aircraft in a position of level flight. So long as the aircraft is flying in a straight course, and does not tilt about its longitudinal axis, the slider 311 remains at its center position and the potential between the terminals 306 and 324 of network 301 is determined only by the position of slider 304. With the slider 304 in its center position, no potential difference exists between terminals 306 and 324. The motor 212 is then not operated and the aircraft maintains its level flight.

If the nose of the aircraft rises, the vertical gyroscope 90 responds to the tilting of the aircraft about an axis passing laterally through it by causing movement of contactor 304 downwardly along resistor 303. This produces a potential difference between terminals 306 and 324 which makes terminal 215 of amplifier 213 positive with respect to terminal 212. The amplifier and motor 214 may be so connected that a potential of this time-phase relation will cause an operation of the motor 212 in a direction to move the contactor 260 to the right, thereby producing at the terminals 227 and 228 of member 221 a potential opposite in polarity to that produced by network 301. At the same time, the elevator is deflected in a direction to restore the aircraft to level flight.

It is believed to be readily understandable that a similar operation takes place in the opposite sense when the nose of the aircraft falls.

It has been found that when an aircraft is maneuvered through a turn, it tends to drop unless a corrective adjustment is made by the elevator. The tendency to drop is the same regardless of the direction in which the aircraft turns. Therefore, the compensating controller 311 is provided, which is operated by the vertical gyroscope 90 and is effective upon a tilting of the aircraft about its longitudinal axis to produce between the terminals 306 and 324 a potential of the proper polarity to cause the elevator to operate in a direction to raise the nose of the aircraft.

The operation of the elevator control system is believed to be apparent from the foregoing discussion. A more complete discussion of a similar system may be found in the Gille application previously mentioned.

The influence of the stabilizing networks on the flight control system will now be explained. Taking network 199 as an example, suppose the pressure upon diaphragm 197 exceeds that on diaphragm 196. The craft will tend to roll to the right, but due to the inertia of the craft, the stress upon it may be absorbed as a strain in the structural members, to be released as motion of the craft as a whole takes place. The vertical gyroscope is not influenced by anything which has thus far occurred, and will not insert a signal into the aileron control system until a change in the attitude of the craft has occurred. However, by the operation of my stabilizing network, a signal may be inserted into the aileron control system to initiate correction of the anticipated change in attitude of the craft before the change has actually taken place.

The pressure differential between diaphragms 196 and 197 results in unequal displacement of contactors 190 and 194 with respect to windings 191 and 193 of such a nature that terminal 189 of network 199 becomes negative with respect to terminal 195. This potential difference is transmitted through networks 122, 121 and 20 to amplifier 113, making terminal 114 positive with respect to terminal 115. As previously pointed out, motor 112 and amplifier 113 respond to the signal to operate the ailerons and to move contactor 160 to the left along winding 158, until the signal potential is cancelled by an equal and opposite signal.

Movement of the ailerons by motor 112 causes the craft to roll in a direction to raise its right wing. This mechanical force combines with the force originally effective on members 196 and 197 and tending to roll the craft in the opposite direction, and actual change of attitude of the craft takes place in proportion to the resultant of these two forces. This change in attitude is corrected by action of the vertical gyro on the rudder, aileron and elevator control systems as outlined above. It will be apparent that the stabilizing network in the elevator control system operates in a manner exactly similar to that just disclosed.

Thus, although the strain within the craft may be somewhat increased, its stability, as a platform for a bomb-sight for example, is greatly improved, not only because of the anticipitating control exercised by the stabilizing network but also because the ultimate change in attitude of the craft is proportional only to such force as remains uncorrected rather than to the original force.

In very nonhomogeneous air such as that over a target during a bombing mission, variations in pressure differential may occur rapidly and erratically and it may be desirable to stabilize the craft in accordance with a factor which represents the average pressure differential over an interval rather than by the instantaneous differential. The electrical operation is the same as that just described, the averaging function being found in mechanical details of the unit which will presently be set forth.

I have disclosed my stabilizing apparatus associated with a complete flight control system for automatically governing all factors of the flight of a craft. However, it must be remembered that my system is not limited to use in such a complicated application, but may also be used simply by itself to stabilize a craft about a given axis or axes, the craft being otherwise controlled by a human pilot.

Figure 3 is a showing of a stabilizing system for an aircraft embodying my invention and leaving the control for the craft at all times in the hands of the pilot. In the figure there is shown an aileron control system including a pulley 410 over which passes a cable 411 which may be attached to the ailerons (not shown). The pulley 410 is driven by a motor 412 by means of a shaft 419. The supply of electrical energy to motor 412 is controlled by an amplifier 413 having a pair of input terminals 414 and 415. Electrical energy is supplied to amplifier 413 from a transformer 409.

Electrical signal potentials are impressed on the amplifier input terminals 414 and 415 from electrical bridge circuit 416 having output terminals 417 and 418 and input terminals 421 and 422. The bridge output terminals are connected with the input terminals of the amplifier by conductors 423 and 424, and the bridge is supplied with electrical energy from the secondary winding 425 of a transformer 426 by means of conductors 427 and 428. Bridge circuit 416 is made up of two fixed resistors 431 and 432 and two variable resistors 433 and 434 comprising windings 435 and 436 and movable contactors 437 and 438, respectively. Variable resistor 433 is connected between output terminal 417 and input terminal 421 and comprises the upper left arm of the bridge. Variable resistor 434 is connected between input terminal 421 and output terminal 418 and comprises the upper right arm of the bridge. Fixed resistor 431 is connected between input terminal 422 and output terminal 417 and comprises the lower left arm of the bridge. Fixed resistor 432 is connected between input terminal 422 and output terminal 418 and comprises the lower right arm of the bridge.

In the figure I have indicated at 440 a manual control arm mounted on shaft 419 of motor 412. This lever is schematically representative of the aileron control function of the pilot's control stick.

It will also be evident that the hand lever follows the movement of the motor to operate the ailerons, thus giving the pilot tactile indication of the operation of the stabilizer, which he can nevertheless override if he so desires. It will also be evident that when electrical energy is not being supplied to motor 412 the pilot maintains manual control of the ailerons through lever 440, shaft 419 and pulley 410; the deenergized motor being rotated by movement of the lever. Alternatively, any suitable disconnect mechanism may be provided or suitable slip friction or manual override mechanisms may be substituted.

Variable resistor 433 may be operatively associated with pressure responsive member 196 as more fully described below so that in response to an increase in pressure upon the pressure responsive member movable contact 437 moves to the left to increase the amount of resistance in the circuit between terminals 417 and 421. In the same way, variable resistor 434 may be operatively associated with pressure responsive member 197 so that on an increase in the pressure upon the pressure responsive member, movable contact 438 moves to the right to increase the amount of resistance in the circuit between terminals 421 and 418. In a preferred form of my invention, the total resistance of winding 435 is the same as that of winding 436 so that regardless of what the pressure upon pressure responsive members 196 and 197 may be, so long as the pressures upon the members are equal, equal amounts of resistance will be in the upper left and upper right arms of the bridge. My preferred form of the invention also contemplates that resistor 431 shall be equal in resistance to resistor 432.

*Operation*

When the parts are in the position shown in Figure 3, movable contacts 437 and 438 are at the centers of their respective windings and the voltage drop between terminal 421 and terminal 417 is the same as the voltage drop between terminals 421 and 418. Terminals 417 and 418 are therefore at the same potential and no input signal is impressed upon amplifier 413. Accordingly, no electrical energy is supplied to motor 412, and control of the ailerons of the craft is maintained only by use of the manual control lever 440. It will be understood that this condition prevails whether the elevation at which the craft is flying increases, decreases, or remains the same, so long as the pressures upon pressure responsive members 196 and 197 remain the same.

If, however, by reason of encountering bumpy air, or by close proximity to concussion waves set up by the explosion of anti-aircraft projectiles, the pressure upon pressure responsive member 197 becomes greater than that upon member 196, thus tending to move the left wing, contactor 438 is moved further to the right along winding 436 than contactor 437 is moved to the left along winding 435. Assuming that this operation takes place during a half cycle of the alternating current supply when the terminals of the transformer secondary windings have the polarities indicated on the drawing, this movement of the control arms is such as to make terminal 418 negative with respect to terminal 417.

Motor 412 and amplifier 413 may be so arranged that when a potential of this phase is impressed on input terminals 414 and 415, the amplifier responds to cause operation of the motor in a direction to rotate pulley 410 so as to cause movement of the ailerons in such a direction as to tend to raise the right wing of the craft in which pressure responsive member 196 is mounted. It will readily be understood that when the pressure differential between pressure responsive members 196 and 197 is removed, movable contact 438 returns to the same relative position along winding 436 as that held by movable contact 437 of resistor 435, thus rebalancing the bridge and removing signal energization to the amplifier and thus energization of motor 412. A pressure differential of the opposite sense initiates operation of motor 412 in the opposite direction.

It is apparent from the foregoing disclosure that motor 412 is operating in one direction or the other continuously, as long as an unbalanced condition of the bridge persists, thus continually increasing the displacement of the ailerons until the pressure differential has disappeared. Since, however, the duration of the pressure differentials encountered by craft in flight is comparatively short, even when transmitted through my prolonging device as described below, no extended effect on the attitude of the ship is brought about by this arrangement. It is also apparent that when rebalance of the craft under the control of the motor has taken place the motor becomes deenergized and control of the craft again remains solely in the manual lever. When energization of the motor ceases the ailerons streamline into normal position unless maintained in some other position by operation of the manual lever.

While I have disclosed my stabilizing device in use about the roll axis of a craft, it is equally adapted to stabilize the craft about its pitch axis.

Figure 4, discloses a simplified structure for performing the function of pressure responsive members 196, 197, 296, and 297, and Figures 5 and 6 disclose refinements in this same structure. Referring to Figure 4, numeral 510 refers to the surface of the hollow wing of an aircraft. Mounted in an aperture 511 in the wing is a diaphragm 512, secured to the wing by any suitable means, as by rivets passing through a clamping ring 513. Wing 510 also supports a motor 514, continuously running at a slow rate of speed in a counter-clockwise direction as indicated, and a pivot 515 of an arm 516 which is continually resiliently urged to move in a clockwise direction by a spring 517 also anchored to wing 510. Carried by the outer portion of arm 516 and insulated therefrom is a movable contactor 520 arranged to move along a resistance winding 521. Contactor 520 and fixed resistance winding 521 of Figure 4 may correspond, for example, with contactor 438 and winding 436 of Figure 3, or with contactor 194 and winding 193 of Figure 2. A pulley 522 is supported in any suitable fashion, as by a bracket 523, and a cord 524 is attached to the center of diaphragm 512, passes over pulley 522 and is connected to arm 516. Motor 514 is provided with a friction drum 525, and cord 524 is passed around the drum for one or more turns in order that a snubbing action may be exerted therebetween.

The operation of this device is as follows. When the device is not in operation, motor 514 is not energized and arm 516 is drawn in a clockwise direction under the influence of spring 517, rotating friction drum 525 in a clockwise direction and displacing diaphragm 512 in an upward direction to a position where its strain balances the strain in the spring. When it is desired to set the device in operation, electrical energy is supplied to motor 514 from any suitable source (not shown), causing rotation of drum 525 in a counter-clockwise direction. This releases a certain amount of the tension in diaphragm 512 and displaces arm 516 in a counter-clockwise direction to such an extent that the frictional force on drum 525 is exactly equal to the increased tension in spring 517. It is obvious that any suitable adjustment means may be provided at the point of attachment of spring 517 with wing 510 to vary this initial tension as may be desired. It is also obvious that an adjustment of the position of resistance 521 with respect to the normal operating position of arm 520 may also be made if it is considered desirable.

Now let it be assumed that while the device is in operation a pressure wave impinges upon diaphragm 512. This pressure wave causes upward movement of the diaphragm, releasing the friction of cord 524 about friction drum 525 and allowing arm 516 to move in a clockwise direction under the influence of spring 517. Arm 516 moves in a clockwise direction as long as slack occurs in cord 524 due to upward displacement of diaphragm 512 and a change in the resistance of any circuit of which winding 521 and contactor 520 form parts is accordingly accomplished.

However, when the pressure wave moves away from diaphragm 512 or when an increased pressure from any other cause is removed away from diaphragm 512, the diaphragm does not immediately resume its normal condition because of snubbing action between the cord and the drum, since removal of the pressure from diaphragm 512 allows cord 524 to become taut around snubbing drum 525. Diaphragm 512 is hence returned to its normal position by the addition of force applied by motor 514 through snubbing drum 525 to oppose the action of spring 517. The rate of return of diaphragm 512 to its normal position accordingly is determined by the speed of revolution of motor 514, and this motor may be adjustable to operate at any desired speed.

The details of pressure responsive members disclosed in Figures 5 and 6 are, with the exception of certain additional refinements specifically mentioned hereinafter, the same as the corresponding details of the pressure responsive member just disclosed. Therefore, each element of the refined pressure responsive devices has been given a number in the 600 to 699 or the 700 to 799 series, and corresponding parts in the three devices have been given the same reference numerals. It is believed that the above discussion of the basic device is full and complete, and a discussion of the refined modifications will be limited to the respective refinements therein introduced.

It is sometimes desired to modify the response to the pressure responsive members of the aircraft control member such, for example, as the ailerons, in accordance with the vertical acceleration of the craft. For this purpose, the embodiments of my pressure responsive device disclosed in Figures 5 and 6 have been developed, although their fundamental operation is the same as that previously disclosed. Thus, in Figure 5, cord 624 is no longer connected directly to diaphragm 612 but is connected to a rigid rod fastened to the diaphragm. A leaf spring member 655 is rigidly fastened to a support 650 carried by the ring 613 and carries at its outer end a portion 657 which is arranged to press downwardly against the top of rod 656. The pivot 615 of rod 616 is also supported by member 650 and a similar member 651 supports a bracket 653 to which the end of spring 617 is attached. After passing around the snubbing drum 625 of motor 614, cable 624 does not connect directly to arm 616, but to a weight 658 which in turn is connected to arm 616. A second weight 659 is arranged for slidable movement in a slot 660 cut in arm 616 for a purpose now to be described. The downward force exerted on rod 656 by spring 655 is equal to the upward force due to weight 658.

It is obvious that if the pressure responsive member as a whole is subjected to vertical acceleration the force acting upon snubbing drum 625 and tending to rotate it in a clockwise direction is no longer simply that of spring 617, but also has a component due to the inertias of masses 658 and 659 as well as that of arm 616. The effective magnitude of this inertia component is positive if the acceleration is upward and negative if the acceleration is downward. The magnitude of the component introduced by the inertia of the masses in response to a given magnitude of acceleration may be adjusted by sliding mass 659 along slot 660. Accordingly, the speed at which diaphragm 612 is returned to its normal position under the influence of snubbing drum 625 is materially increased by downward acceleration of the craft and materially decreased by upward acceleration of the craft, and similarly the rate of displacement of diaphragm 612 upwardly under the influence of a pressure wave is increased or diminished under the influence of weights 658 and 629 according to whether the rate or acceleration of the craft is in an upward or downward direction.

A still further refinement of my pressure responsive member is disclosed in Figure 6, which discloses means for permitting the speed of movement of diaphragm 712 to be varied by a factor determined by the vertical acceleration of the craft in a downward direction but not by the vertical acceleration of the craft in an upward direction. To accomplish this, mass 758 is provided with a passage through which cord 724 may freely move, the cord being fastened directly to diaphragm 712 at one end and to arm 716 at the other. Mass 758 is supported by a spring leaf member 755, through which cord 724 also passes. Fixed to cord 724 is a member 770 of such size that it is incapable of passing through the passage in weight 758. Member 770 is located above mass 758 so that upon upward acceleration of the craft the mass, moving downwardly, has a free passage along cord 724, but so that during downward acceleration of the craft, the mass, moving upwardly, comes in contact with member 770, thereafter applying a force due to the inertia of mass 758 in a direction opposing the action of spring 717.

Likewise, it should be noted that it is possible to design this device so as to be responsive to accelerations only, by eliminating the sensing diaphragm and substituting a tension spring.

While I have disclosed preferred means for accomplishing my invention, alternative methods and equivalent expedients will become obvious to those skilled in the art upon a perusal of my disclosure. It is therefore to be considered as illustrative only. The features of novelty which characterize my invention are pointed out with particularity in the following claims.

I claim as my invention:

1. In a system of the class described, in combination, a device giving like response to a rapid variation in a first condition and to an independent less rapid variation in a second condition, control means effective upon said device to overcome said response, said control means being effective with a rapidity of the same order as that of said second variation and with less rapidity than that of said first variation, means responsive to said second variation to actuate said control means, and means responsive to said first variation to independently actuate said control means, said last mentioned responsive means including means prolonging the effective duration of said first variation through a period comparable to that of the effectuation of said control means.

2. In a flight control system, an aircraft having mutually perpendicular pitch, roll, and turn axes, means carried by said craft for maintaining fixed mutually perpendicular axes which may be coordinated with said axes of said craft, means responsive to deviation of an axis of said craft from a coordinated arbitrary axis, control means actuated by said responsive means for altering an attitude of said craft to return said axes to coordinated relation, independent means for adjusting the coordination of a plurality of said axes of said craft with a like plurality of said arbitrary axes, pressure sensitive members spaced about an axis of said craft, and independent means actuating said control means in response to changes in the relative pressures upon said pressure sensitive members.

3. In a flight control system, an aircraft having mutually perpendicular pitch, roll, and turn axes, means carried by said craft for maintaining fixed mutually perpendicular axes, which may be coordinated with said axes of said craft, means responsive to deviation of an axis of said craft from a coordinated arbitrary axis, control means actuated by said responsive means for altering an attitude of said craft to return said axes to coordinated relation, independent means for adjusting the coordination of a plurality of said axes of said craft with a like plurality of said arbitrary axes, pressure sensitive members spaced about an axis of said craft, and independent means actuating said control means in response to instantaneous transitory changes in the relative pressures upon said pressure sensitive members.

4. In a flight control system for an aircraft having mutually perpendicular pitch, roll, and turn axes, means carried by said craft for maintaining fixed mutually perpendicular axes, which may be coordinated with said axes of said craft, means responsive to deviation of an axis of said craft from a coordinated arbitrary axis, control means actuated by said responsive means for altering an attitude of said craft whereby to return said axes to coordinated relation, independent means for adjusting the coordination of a plurality of said axes of said craft with a like plurality of said arbitrary axes, pressure sensitive members spaced about an axis of said craft, and independent means actuating said control means in response to transitory changes in the relative pressures upon said pressure sensitive members, of slight duration compared with said deviation.

5. In a flight control system, an aircraft having mutually perpendicular pitch, roll, and turn axes, means carried by said craft for maintaining fixed mutually perpendicular axes, which may be coordinated with said axes of said craft, means responsive to deviation of an axis of said craft from a coordinated arbitrary axis, control means actuated by said responsive means for altering an attitude of said craft, whereby to return said axes to coordinated relation, independent means for adjusting the coordination of a plurality of said axes of said craft with a like plurality of said arbitrary axes, pressure sensitive members spaced about an axis of said craft, and independent means having quick response but a delayed return arrangement for actuating said control means in response to transitory changes in the relative pressures upon said pressure sensitive members, of slight duration.

6. In a flight control system, an aircraft having mutually perpendicular pitch, roll, and turn axes, means carried by said craft for maintaining fixed mutually perpendicular axes, which may be coordinated with said axes of said craft, means responsive to deviation of an axis of said craft from a coordinated arbitrary axis, control means actuated by said responsive means for altering an attitude of said craft comparable to that of said deviation, whereby to maintain said axes in coordinated relation, independent means for adjusting the coordination of a plurality of said axes of said craft with a like plurality of said arbitrary axes, pressure sensitive members spaced about an axis of said craft, and independent means actuating said control means in response to transitory changes in the relative pressures upon said pressure sensitive members, of slight duration.

7. Electrical apparatus for positioning a flight controlling surface on an aircraft, comprising in combination, motor means for driving said surface, a plurality of bridge circuits having an output of one bridge connected to an output of another bridge whereby said bridges are connected in series, each said bridge circuit comprising a source of electrical energy, a pair of adjustable impedance members connected in parallel across the terminals of said source, and a pair of adjusting means cooperating severally with said impedance members, means driven by said motor means for actuating one of said adjusting means in one of said bridge circuits, manually operable means for actuating the other adjusting means in said one of said bridge circuits, means responsive to each of a pair of controlling conditions, indicative of need for the operation of said surface, for respectively actuating the adjusting means in another of said bridge circuits, further means responsive to each of a second pair of controlling conditions indicative of need for the operation of said surface, for respectively actuating the adjusting means in still another of said bridge circuits, and means connected to a remaining output of the two end bridges of the series and responsive to the potential across said series connected bridge circuits for controlling said motor means.

8. Electrical apparatus for positioning a flight controlling surface on an aircraft, comprising in combination, motor means for driving said surface, a plurality of bridge circuits connected in series whereby the outputs of intermediate bridges are connected to an output of each adjacent bridge leaving one output terminal for each end bridge of the series, each said bridge circuit comprising a source of electrical energy, a pair of resistances connected in parallel across the terminals of said source, and a pair of contacts one movable along each of said resistances, means driven by said motor means for displacing one of the contacts in one of said bridge circuits, manually operable means for displacing the other contact in said one of said bridge circuits, means responsive to each of a pair of controlling conditions, indicative of need for the operation of said surface, for respectively displacing each of the contacts in another of said bridge circuits, further means responsive to each of a second pair of controlling conditions indicative of need for the operation of said surface, for respectively displacing each of the contacts in still another of said bridge circuits, said second means including means maintaining the displacement of said contacts for a time after the conditions to which said second means are responsive have returned to a normal value, means connected to the output of the series connected bridges and controlling said motor means.

9. Stabilizing apparatus for an aircraft having a normal attitude about an axis comprising, in combination, control surface means adapted to alter said attitude, motor means operating said control surface means, means responsive to a change in attitude for controlling said motor means, pressure sensitive members spaced about said axis, and further means controlling said motor means in response to transitory changes in the relative pressures upon said pressure sensitive members, said further means including means prolonging the duration of effects of transitory changes in said relative pressures.

10. For association with an aircraft having mutually perpendicular pitch, roll and turn axes and also having means establishing mutually perpendicular axes stabilized in space which may be coordinated with the axes of the aircraft, together with motor means operative upon a control surface of said aircraft to cause movement of said axes of said craft with respect to said established axes, the combination which comprises means responsive to variation in the relation between one of said axes of said aircraft and one of said stabilizing axes, pressure sensitive members spaced about a further axis of said craft, means energizing said motor means independently in response to said responsive means and to the differential response of said pressure sensitive members, and means prolonging the differential response of said pressure sensitive members.

11. Control apparatus for an aircraft subject to change in attitude, comprising: normally manually operable control means effective upon said craft to overcome said change in attitude, and means responsive to change in the relative lift exerted upon cooperating airfoil surfaces of said craft to independently operate said normally manually operable means, said last mentioned means including means prolonging the duration of the response to said change in relative lift.

12. An aircraft stabilizing apparatus for an aircraft having a normal attitude about an axis; comprising control surface means adapted to alter said attitude; motor means operating said control surface means; means responsive to a change in attitude for controlling said motor means; pressure sensitive members spaced about said axis; and further means actuating said motor means in response to transitory changes in the relative pressures upon said pressure sensitive members: said further means comprising a pair of variable resistors, electrical circuit means associating said resistors with said motor means for influencing the energization thereof, and first and second means mechanically influencing the resistance of each of said resistors; each said first means connecting its associated resistor with one of said members for responsive actuation thereby, and each said second means snubbingly damping said responsive actuation of said resistor in a first direction only; whereby to prolong the duration of otherwise transitory changes in said relative pressures whose normal duration is small.

13. Stabilizing apparatus for an aircraft having a normal attitude about an axis; comprising: control surface means adapted to alter said attitude; motor means operating said control surface means; means responsive to changes in attitude for controlling said motor means; pressure sensitive members spaced about said axis; and further means actuating said motor means in response to transitory changes in the relative pressures upon said pressure sensitive members: said further means comprising a pair of variable resistors, electrical circuit means associating said resistors with said motor means for influencing the energization thereof, and first and second means mechanically influencing the resistance of each of said resistors; each said first means comprising connecting means and a wiper for a resistor for operatively connecting its associated resistor with one of said members for responsive actuation thereby, and each said second means including a continuously running motor having a drum around which said connecting means between said member and wiper is wound to constitute, snubbing means cooperating with said member, and said wiper, and spring means connected to the opposite side of said wiper all whereby to damp said responsive actuation of said wiper in a first direction only; whereby to prolong the duration of the response to transitory changes in said relative pressures whose normal duration is small.

14. In a flight control system: an aircraft having mutually perpendicular pitch, roll, and turn axes; means carried by said craft for maintaining three arbitrary, mutually perpendicular axes which may be coordinated with said axes of said craft; means responsive to deviation of an axis of said craft from a coordinated arbitrary axis; and control means actuated by said responsive means to alter an attitude of said craft, whereby to return said axis to coordinated relation with said arbitrary axis; said control means comprising a motor; normally balanced electrical bridge means for energizing said motor when said normal condition of balance is disturbed; said responsive means being effective to change the condition of balance of said bridge; pressure sensitive members spaced about an axis of said craft; variable impedance members comprising a portion of said bridge circuit and varied in accordance with response of said pressure sensitive members; and means snubbingly damping the variation of said impedance members in a first direction only; whereby to prolong the duration of response of said members to transitory changes in said relative pressures.

15. Control apparatus for an aircraft subject to a change in attitude and having a control surface, comprising: control means effective upon said surface to overcome said change in attitude; means responsive to said change in attitude to actuate said control means in proportion to said change; and means responsive to a concussive change in the relative lift exerted upon cooperating airfoil surfaces, said relative lift responsive means including a rapidly, proportional to relative lift displaceable and variable time return means whereby the effect of said concussive change may be prolonged sufficiently to proportionally independently actuate said control means.

16. Control apparatus for an aircraft having ailerons for controlling the craft about its longitudinal axis, comprising: means for maintaining alignment with a horizontal direction; means for operating said ailerons; a first electrical signal means responsive to the direction and extent of angular deviation in a horizontal plane of said longitudinal axis and said horizontal direction means; pressure sensitive members spaced about the longitudinal axis of said craft; means responsive to said sensitive members for providing a second electrical signal in accordance with the direction and extent of the pressure differences; means for combining said first and second electrical signals; and means operated by a signal resulting from said combining and controlling said aileron operating means.

17. Control apparatus for an aircraft having a control surface adapted to alter or maintain the attitude of the aircraft about an axis, said apparatus comprising: motor means for operating said control surface; pressure sensitive members on said craft spaced about said axis and capable of responding to rapid pressure changes; displaceable means for effecting control of said motor means; and transmission means connected to said sensitive means and said control effecting means, said transmission means including means for transmitting directly to said control effecting means without substantial opposition the proportionate effect of said sensitive members and said transmission means also being constructed to govern the period of return of said displaceable means on removal of said pressures.

18. Control apparatus for an aircraft having control surfaces for controlling the aircraft about an axis; motor means for operating said control surfaces; control means for said motor means; a pressure responsive device located in each wing of said aircraft on opposite sides of said axis, each of said pressure responsive devices including a controller means responsive to the vertical acceleration of said wing and also responsive to the pressure applied to said pressure responsive device; and means differentially controlled by both said controller means and connected to said control means.

GEORGE L. BORELL.

REFERENCES CITED

The following references are of record in the file of this patent:

UNITED STATES PATENTS

| Number | Name | Date |
|---|---|---|
| 1,335,898 | Jones | Apr. 6, 1920 |
| 1,351,538 | Reynolds | Aug. 31, 1920 |
| 1,921,550 | Swallen | Aug. 8, 1933 |
| 1,972,336 | Gardner | Sept. 4, 1934 |
| 2,005,530 | Boykow | June 18, 1935 |
| 2,071,256 | Dobbs | Feb. 16, 1937 |
| 2,159,142 | Fischer | May 23, 1939 |
| 2,162,862 | Protzen | June 20, 1939 |
| 2,235,930 | Huggins | Mar. 25, 1941 |
| 2,387,795 | Isserstedt | Oct. 30, 1945 |

Certificate of Correction

Patent No. 2,498,064                                             February 21, 1950

GEORGE L. BORELL

It is hereby certified that errors appear in the printed specification of the above numbered patent requiring correction as follows:

Column 4, line 43, for the word "conductor" read *contactor*; column 12, line 33, for the reference numeral "212" read *214*; line 34, for "214" read *212*;

and that the said Letters Patent should be read with these corrections therein that the same may conform to the record of the case in the Patent Office.

Signed and sealed this 15th day of August, A. D. 1950.

[SEAL]

THOMAS F. MURPHY,
*Assistant Commissioner of Patents.*